Figure 1:
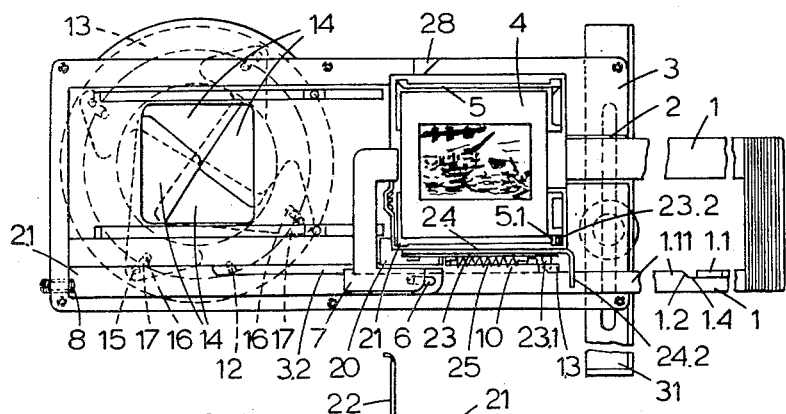

Aug. 14, 1962  E. KORF  3,049,052
PICTURE PROJECTOR
Filed Oct. 26, 1959  3 Sheets-Sheet 1

INVENTOR
ERICH KORF

Aug. 14, 1962 E. KORF 3,049,052
PICTURE PROJECTOR
Filed Oct. 26, 1959 3 Sheets-Sheet 2

INVENTOR
*ERICH KORF*

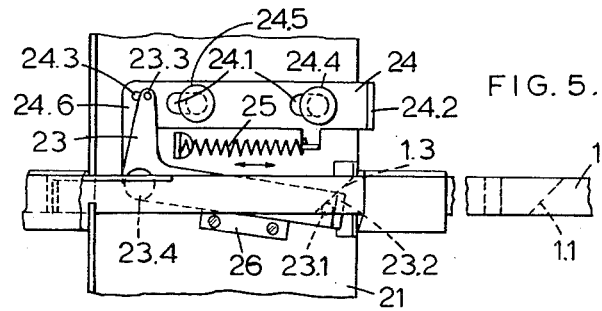
FIG. 5.
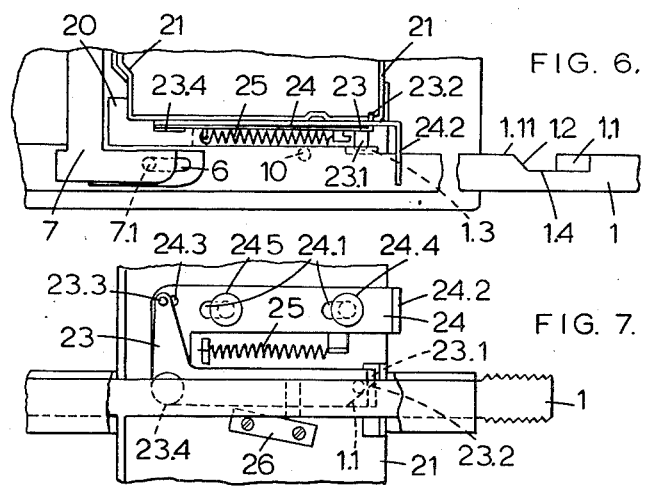
FIG. 6.
FIG. 7.
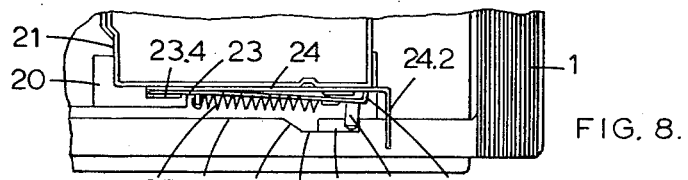
FIG. 8.
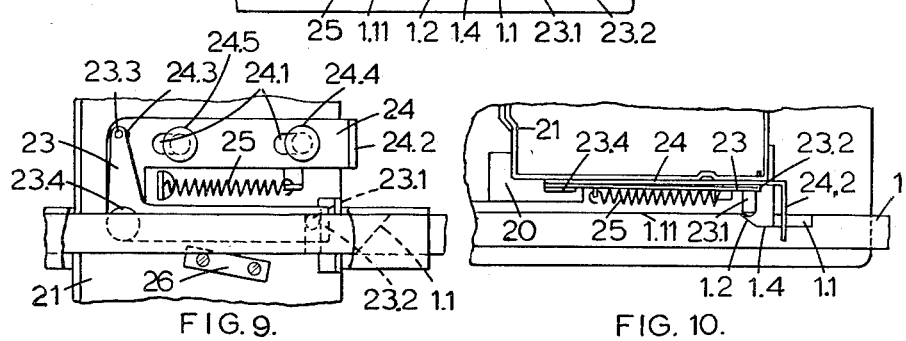
FIG. 9.   FIG. 10.

3,049,052
PICTURE PROJECTOR
Erich Korf, Dresden, Germany, assignor to VEB Kamera-
und Kinowerke Dresden, Dresden, Germany
Filed Oct. 26, 1959, Ser. No. 848,837
6 Claims. (Cl. 88—28)

The invention relates to a picture projector with attachable, semi-automatic transparency-slide changing arrangement, wherein the slide to be projected is guided with the aid of a slide transporting element out of the magazine into the projection ray path and back and the transporting of a slide magazine movable parallel to the optical axis of a projection lens is derived from the return movement of the sliding element.

Arrangements of the specified nature have become known, which are to effect a positive advancement of the magazine from picture to picture, with the simplest possible means, without the aid of conveyor springs or extensive feed gears working in claw fashion. For this purpose there is mounted on one of the arms of the slide transporting element which moves the transparency back and forth an actuating pawl which slides along, for the withdrawal of the slide, on an oblique guide movable with the magazine, and thus effects the advancement of the magazine in each case by one picture spacing. In order to realise this idea, oblique guides for the actuating pawl are mounted in a drum, with which there is connected a drive pinion for the magazine, or to each slide there is allocated a guide groove curved at its outlet end contrarily to the direction of advancement of the magazine.

Other constructions which have become known provide means on the magazine guide which so deflect the movement of the slide, taking place perpendicularly of the longitudinal axis of the magazine, that thus the magazine is moved each time by one operating step along its longitudinal axis. The claw which returns the slide is here resiliently connected with the transporting element, so that the excess stroke necessary for the transport of the still magazine is compensated.

Another, similarly known, way consists in that the transportation of the magazine commences already during the pushing in of the slide, and this movement is compensated in that the slide element itself, or a part thereof, springs in the direction of the longitudinal axis of the magazine.

The known constructions have a plurality of disadvantages. They cannot dispense for example with an additional catch arrangement. Furthermore they cannot avoid using arms and/or helical springs which become effective within the movement operation repeated with every change of slide. However all movement operations which are caused by the action of such springs are not positive, and can cause disturbances in the course of the operation.

The invention removes these disadvantages and achieves further advantages due to the fact that the longer arm, extending through beneath the magazine, of the slide element guided in a groove of the carrier of the changing device, possesses curves for the control of a magazine transport lever, which are effective in different directions of movement, and that the transporting element also carries a claw for the return of the slide into the magazine and a control pin for the opening and closing of the shutter for the projection light cone.

In further development of the arrangement according to the invention the conveyor lever is produced from spring steel strip or similar material which is resilient in one direction, and presses its pin, which co-operates with the cam profiles of the longer arm of the transporting slide element, constantly against this longer arm.

In order further to amplify the arrangement according to the invention, the claw for the return of the slide into the magazine is movable with frictional braking within a space provided by slots or the like and is secured on the longer arm of the slide transporting element. For the same purpose a control pin secured in the longer arm of the slide transporting element engages, shortly before the end of the movement with which the slide is brought into the projection ray path, in a slot provided for this purpose in the blade driving ring of a blade-type shutter, in order to open this shutter and to close it again at the commencement of the return of the slide.

Now a possible form of embodiment of the invention is to be explained in greater detail hereinafter by reference to an example, from which further features peculiar thereto may be seen. Here all details which are not directly connected with the invention have been omitted.

Figure 2:
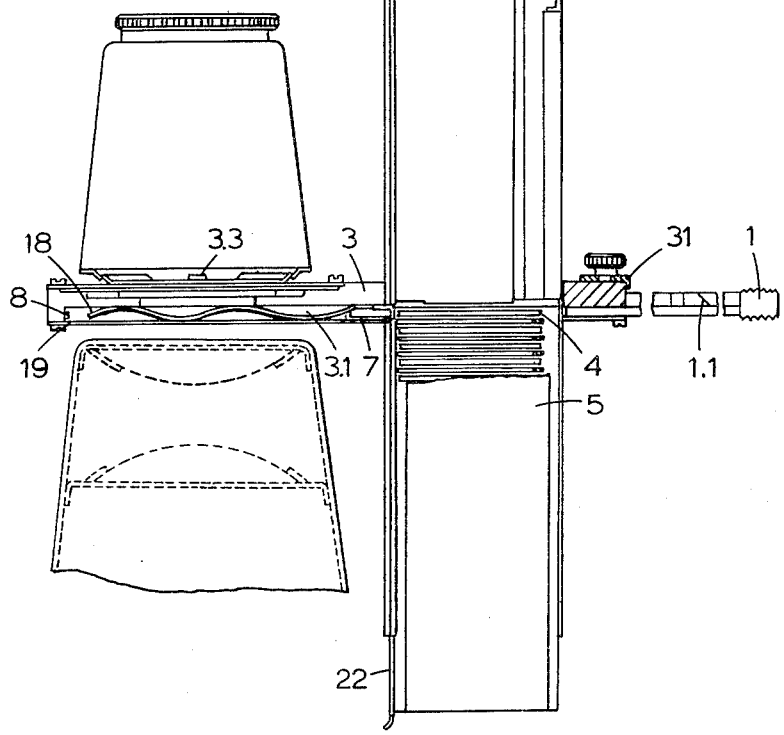
Figure 3:
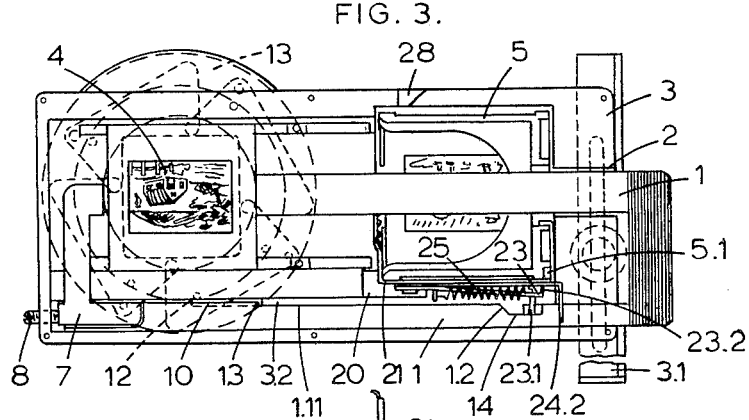
Figure 4:
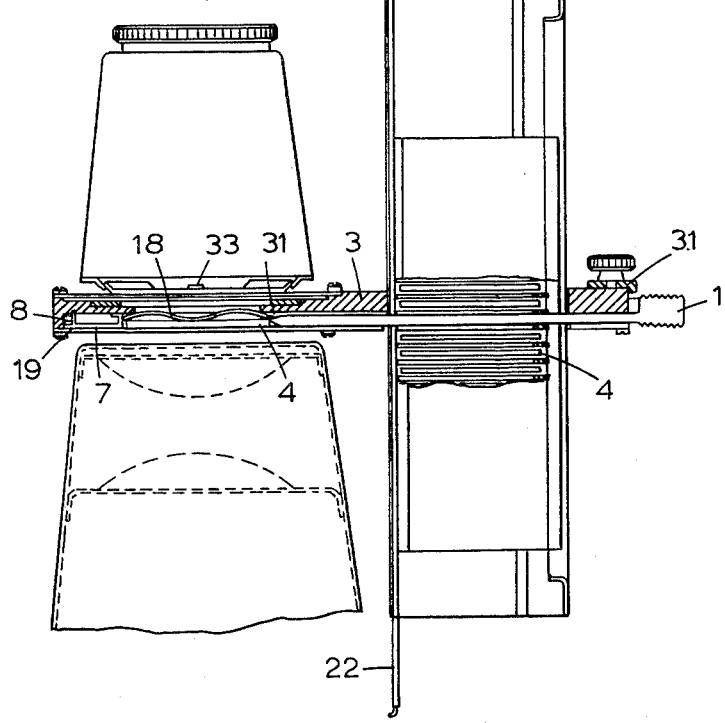

FIGURE 1 shows an elevation of the changing arrangement before the conveying of the transparency into the projection ray path, shutter closed, partially in section, FIGURE 2 shows a plan view of FIGURE 1, FIGURE 3 shows an elevation of the changing arrangement after the conveying of the transparency into the projection ray path, shutter open, partially in section, FIGURE 4 shows a plan view of FIGURE 3, FIGURE 5 shows the transport mechanism, seen from beneath, at the end of one stepwise movement of the magazine, FIGURE 6 shows the partial elevation of FIGURE 5, FIGURE 7 shows the transport mechanism, seen from below, at the end of the return movement of the transport element, FIGURE 8 shows the part elevation of FIGURE 7, FIGURE 9 shows the transport mechanism, seen from beneath, during the movement for the return of the transparency slide, and, FIGURE 10 shows a partial elevation of FIGURE 9.

The transparency slide transporting element 1 is guided in two channels 2.1 of the carrier 3. On pushing in of the transporting element 1 the transparency slide 4 is conveyed by the upper arm of the element 1 into a channel 3.1 of the carrier 3 out of the magazine 5 into the projection ray path (FIGURES 1 and 2). The movable claw 7, mounted by means of pins 7.1 running in a slot 6 on the longer, lower arm of the element 1, and braked by friction, abuts shortly before termination of the conveying of the slide against the adjusting screw 8 and slides on the lower arm of the slide element into one end position with respect to said transporting element, limited by the pin 7.1 abutting against one end of the slot 6. Similarly shortly before the slide 4 has reached its projection position, the pin 10, also secured on the longer, lower arm of the slide transporting element 1, and extending into the picture channel 3.1 of the carrier 3, engages in a slot 12 of the blade ring 13 and rotates the latter by a specific amount around the optical axis of the projector. The four blades 14 are mounted on pins 15 supported by the carrier 3 and are hingedly connected with the blade driving ring 13 by pins 16 engaging in recesses 17 of the blade driving ring 13. Due to the rotational movement of the blade driving ring the blades 14 are pivoted outwards and clear the projection ray path. The slide still 4 is pressed, in the projection position, by leaf springs 18 against the back plate 19 (FIGURES 3 and 4).

If now the transporting element 1 is withdrawn, the blade driving ring 13, entrained by the pin 10, rotates in the opposite direction and effects the closing of the shutter blades 14. The claw 7 guides the slide 4 back into the magazine 5 until it abuts on the stop 20. During the continued return movement of the transporting element 1, the friction of the claw 7 upon the lower, longer arm of the slide element 1 is overcome, and this claw again slides into its initial position with respect to the transporting element 1, the pin 7.1 abutting against the other end of the slot 6. The transporting of the magazine 5 is derived from the described movement back and forth of the element 1. This magazine 5 is guided in a rail 21 screwed to the carrier 3 and also forming guides for strips 22 which prevent the slides 4 from falling out of the magazine 5 even in the end positions thereof, when they have been lifted out as far as their stop, before the insertion of the magazine 5 into the rail 21 (FIGURE 2). The transporting of the magazine is effected by a transport lever 23, which co-operates with control faces 1.1, 1.2, 1.3 on the lower arm of the transporting element 1 (FIGURES 1 to 8).

This lever is pivotally mounted at 23.4 on an operating angle piece 24, which in turn is movably secured on the rail 21 by spigots 24.5 and 24.4 which project through slots 24.1. The spigots 24.5 and 24.4 are held against one end of the slots 24.1 by a spring 25 which is connected between the angle piece 24 and a fixed point on the carrier 3.

When now the transporting element 1 is pushed in, the pin 23.1 of the transport lever 23 which lever is formed of resilient material, slides along the upper edge of the lower arm of the element 1.

When the pin 23.1 has reached the control face 1.2, it slides downwards on this face 1.2, until the lug 23.2 of the transport lever 23 comes out of engagement with the row of teeth 5.1 provided on the edge of the magazine 5.

The pin 23.1 is then again guided parallel with the transporting element arm edge by a face 1.4 adjoining the control face 1.2, whereupon it then strikes upon the control face 1.1 and the transport lever 23 is moved by the latter until the lug 23.2 stands opposite the next gap in the row of teeth, 5.1, ready for engagement (FIGURES 3, 4, 7, 8). The transport lever remains in this position until the slide element 1 is drawn out again.

The magazine 5 is meanwhile secured by the upper arm of the transporting element 1.

When the element 1 is drawn out, its control face 1.2, through the pin 23.1, lifts the transport lever 23, so that the lug 23.2 thereof engages in the gap of the row of teeth 5.1 which is above it.

When the transporting of the slide 4 back into the magazine 5 is terminated, the pin 23.1 strikes upon the control face 1.3. During the now commencing extra movement of the transport lever 23 permitted by the slot 6 the magazine 5 is moved by one operative step under the action of the control face 1.3 which moves the lug 23.2.

The two end positions of the transport lever 23 are additionally marked in the example of embodiment by detents consisting of a bead 23.3 and two bores 24.3.

The movement of the slide element 1 and thus the operative step for the magazine transport is limited in the withdrawal by a stop 26. For the case where any desired still is to be projected out of the sequence in the magazine, the lug 24.2 of the operating angle piece 24 is grasped and the angle piece 24 is drawn outwards against the action of the spring 25 until the spigots 24.4, 24.5 abut against the other end of slots 24.1. Since the transport lever 23 is pivotally mounted on the angle-piece 24 the lever 23 is also moved whereby the lug 23.2 is moved out of engagement with the row of teeth 5.1 of the magazine 5, so that the magazine 5 is free to be moved by hand to any desired position.

In order to make the arrangement still more complete, the selection of any desired still situated in the magazine is facilitated by the provision of a number strip arranged on the magazine which may be viewed through a window 28.

I claim:

1. In a slide projector having a housing, a lamp and condenser system mounted within the housing, a shutter device arranged in the housing on the axis of said system comprising a plurality of blades movable by a blade driving ring, a slide receiving channel situated between the lamp and the shutter device, and a carrier attached to the housing and adapted to receive a slide magazine which is movable in a direction parallel to the axis of said lamp and condenser system and which is provided with a series of teeth along one edge, the provision of a slide transporting member slidably mounted on the carrier for movement at right angles to said axis from a fully withdrawn position to a fully pushed-in position and back, for moving each slide in turn from the magazine into the slide receiving channel and back into the magazine, a resilient magazine transporting lever pivotally mounted on the carrier on a vertical axis parallel to the plane of the slide receiving channel, which plane includes the plane of that slide which is adjacent said slide receiving channel, a driving element connected to said transporting lever engageable with the teeth on said magazine, a cam follower rigidly connected to said transporting lever, a cam engaged by said cam follower carried by said slide transporting member, having a first inclined surface contained in a plane at right angles to the plane of the slide receiving channel and parallel to the direction of movement of the magazine, which first inclined surface of the final movement of the slide transporting member into its fully pushed-in position pivots the transporting lever which positions the driving element adjacent a space between two teeth on the magazine, a second inclined surface contained in a plane at right angles to the plane containing said first inclined surface, which second inclined surface on the commencement of the withdrawing stroke of the slide transporting member moves the transporting lever against its resilience which positions the driving element between said two teeth of the magazine, and a third inclined surface contained in a plane parallel to the plane containing said first inclined surface, which third inclined surface on the final movement of the slide transporting member into its fully withdrawn position pivots the transporting lever which moves the magazine along one step by means of the driving element engaged between said two teeth, and a pin on said slide transporting lever which engages a recess provided on the blade driving ring towards the end of the movement of the slide transporting element into its fully pushed-in position to rotate said blade driving ring whereby the shutter is opened.

2. A slide projector according to claim 1, wherein an angle member is slidably mounted on the carrier, which angle member provides the pivotal mounting of the magazine transporting lever on the carrier, and a spring connected between said angle member and a fixed point on the carrier, said angle member and consequently the magazine transporting lever being movable against the action of the spring to a position where the driving element disengages the teeth on the magazine so that the latter is free to be moved to any desired position for selection of the required slide to be projected.

3. A slide projector as claimed in claim 2, wherein the magazine transporting lever is in the form of a bell-crank lever, one arm of which carries said driving element, a projection being provided on the other arm thereof for cooperation alternately with two depressions formed on the angle member, whereby the magazine transporting lever is located alternately in one position and then another according to the position of the slide transporting member.

4. A slide projector according to claim 1, wherein the magazine transporting lever is produced from strip spring steel.

5. A slide projector according to claim 1, wherein a first stop is provided in the housing for limiting the position of the slide transporting element in its fully pushed-in position and a second stop is provided on the carrier for limiting the movement of the magazine transporting lever.

6. A slide projector according to claim 1, wherein a slide gripper for the withdrawal is connected to the slide transporting member, said connection being effected by a pin projecting from said transporting member which engages a slot provided in the gripper.

References Cited in the file of this patent
UNITED STATES PATENTS

| | | |
|---|---|---|
| 1,402,791 | Petherick | Jan. 10, 1922 |
| 2,427,164 | Stechbart | Sept. 9, 1947 |
| 2,579,281 | Tuck | Dec. 18, 1951 |
| 2,878,719 | Lutes | Mar. 24, 1959 |
| 2,916,965 | Jungjohann | Dec. 15, 1959 |